US007927709B2

(12) United States Patent
Eichmann et al.

(10) Patent No.: US 7,927,709 B2
(45) Date of Patent: Apr. 19, 2011

(54) WEAR-RESISTANT COATING AND A COMPONENT HAVING A WEAR-RESISTANT COATING

(75) Inventors: Wolfgang Eichmann, Puchheim (DE); Rolf Gerstner, Munich (DE); Karl-Heinz Manier, Scheyern (DE); Markus Uecker, Munich (DE); Thomas Uihlein, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 1246 days.

(21) Appl. No.: 10/568,697

(22) PCT Filed: Dec. 22, 2004

(86) PCT No.: PCT/DE2004/002800

§ 371 (c)(1),
(2), (4) Date: Aug. 9, 2006

(87) PCT Pub. No.: WO2005/066384

PCT Pub. Date: Jul. 21, 2005

(65) Prior Publication Data

US 2007/0190351 A1 Aug. 16, 2007

(30) Foreign Application Priority Data

Jan. 9, 2004 (DE) ......................... 10 2004 001 392

(51) Int. Cl.
*B32B 9/00* (2006.01)
*F01D 5/14* (2006.01)

(52) U.S. Cl. ........ 428/469; 428/472; 428/689; 428/697; 428/698; 428/699; 428/701; 428/702; 428/704; 416/241 R; 416/241 B

(58) Field of Classification Search .................. 428/469, 428/472, 689, 697, 698, 699, 701, 702, 704; 416/241 R, 241 B
See application file for complete search history.

(56) References Cited

U.S. PATENT DOCUMENTS

| | | | | |
|---|---|---|---|---|
| 4,481,237 | A * | 11/1984 | Bosshart et al. ........... | 427/376.4 |
| 4,761,346 | A * | 8/1988 | Naik ............................. | 428/627 |
| 5,547,767 | A | 8/1996 | Paidassi et al. | |
| 2002/0102400 | A1 | 8/2002 | Gorokhovsky et al. | |
| 2004/0072038 | A1 | 4/2004 | Henderer | |

FOREIGN PATENT DOCUMENTS

| | | | |
|---|---|---|---|
| EP | 0 366 298 | A2 | 5/1990 |
| EP | 1 382 709 | A1 | 1/2004 |

* cited by examiner

*Primary Examiner* — Gwendolyn Blackwell
(74) *Attorney, Agent, or Firm* — Crowell & Moring LLP

(57) ABSTRACT

A wear-resistant coating, in particular an erosion-resistant coating for a component that is exposed to fluidic loads, is disclosed. The wear-resistant coating has one or more multi-layer systems applied repeatedly to the surface to be coated, where each of the applied multilayer systems has at least four different layers. A first layer of each multilayer system facing the surface to be coated is made of a metallic material adapted to the composition of the component surface to be coated. A second layer applied to the first layer of each multilayer system is made of a metal alloy material adapted to the composition of the component surface to be coated. A third layer applied to the second layer of each multilayer system is made of a gradated metal-ceramic material and a fourth layer applied to the third layer of each multilayer system is made of a nanostructured ceramic material.

16 Claims, 2 Drawing Sheets

WEAR-RESISTANT COATING AND A COMPONENT HAVING A WEAR-RESISTANT COATING

This application claims the priority of International Application No. PCT/DE2004/002800, filed Dec. 22, 2004, and German Patent Document No. 10 2004 001 392.6, filed Jan. 9, 2004, the disclosures of which are expressly incorporated by reference herein.

BACKGROUND AND SUMMARY OF THE INVENTION

The present invention relates to a wear-resistant coating, in particular an erosion-resistant coating, preferably for gas turbine components. In addition, the invention relates to a component having such a wear-resistant coating.

Components that are exposed to high fluidic loads such as gas turbine components are subject to wear due to oxidation, corrosion and erosion. Erosion is a wear process caused by solids entrained in the gas flow. To prolong the lifetime of components exposed to fluidic loads, wear-resistant coatings, also known as armoring, to protect the components from wear, especially erosion, corrosion and oxidation, are required.

European Patent EP 0 674 020 B1 describes a multilayered erosion-resistant coating for surfaces of substrates. The erosion-resistant coating disclosed there provides a wear-resistant coating consisting of several multilayer systems applied to the substrate to be coated. For example, in European Patent EP 0 674 020 B1, the multilayer systems that are applied in repeating layers are formed from two different layers, namely first a layer of a metallic material and secondly a layer of titanium diboride. Since the multilayer systems applied repeatedly to produce the erosion-resistant coating according to European Patent EP 0 674 020 B1 are formed of only two layers, alternating layers of metallic material and layers of titanium diboride are arranged in the erosion-resistant coating disclosed there.

European Patent EP 0 366 289 A1 discloses another erosion-resistant and corrosion-resistant coating for a substrate. According to European Patent EP 0 366 289 A1, the wear-resistant coating is formed from multiple multilayer systems applied repeatedly to the substrate to be coated, each multilayer system in turn consisting of two different layers, namely a metallic layer, e.g., made of titanium, and a ceramic layer, e.g., made of titanium nitride.

Another erosion-resistant and abrasion-resistant wear-preventing coating is known from European Patent EP 0 562 108 B1. The wear-resistant coating disclosed there is in turn formed from multiple multilayer systems applied repeatedly to a substrate to be coated. FIG. 4 in European Patent EP 0 562 108 B1 discloses a wear-resistant coating formed by several multilayer systems applied repeatedly, each multilayer system in turn consisting of four layers, namely a ductile layer of tungsten or a tungsten alloy and three hard layers, whereby the three hard layers differ with regard to the presence of an additional element.

Hence this background, the problem on which the present invention is based is to create a novel wear-resistant coating and a component having such a wear-resistant coating.

According to this invention, each of the multilayer systems applied repeatedly has at least four different layers. A first layer of each multilayer system facing the surface to be coated is formed by a metallic material adapted to the composition of the component surface that is to be coated. A second layer of each multilayer system applied to the first layer is formed by a metal alloy material adapted to the composition of the component surface to be coated. A third layer of each multilayer system applied to the second layer is formed by a gradated metal-ceramic material and a fourth layer of each multilayer system applied to the third layer is formed by a nanostructured ceramic material.

The inventive wear-resistant coating ensures very good erosion resistance and oxidation resistance and has an extremely low influence on the vibrational strength of the coated component. It is suitable in particular for coating complex components such as guide vanes, rotor blades, guide vane segments, rotor blade segments and integrally bladed rotors.

Several such multilayer systems are applied repeatedly to the surface of the component exposed to fluidic loads, with an adhesive layer preferably being applied between the surface of the component and the first multilayer system directly adjacent to the surface.

Preferred refinements of the present invention are derived from the following description. Exemplary embodiments of the present invention are explained in greater detail below with reference to the drawings, although they are not limited to these embodiments.

DETAILED DESCRIPTION OF THE DRAWINGS

Figure 1:
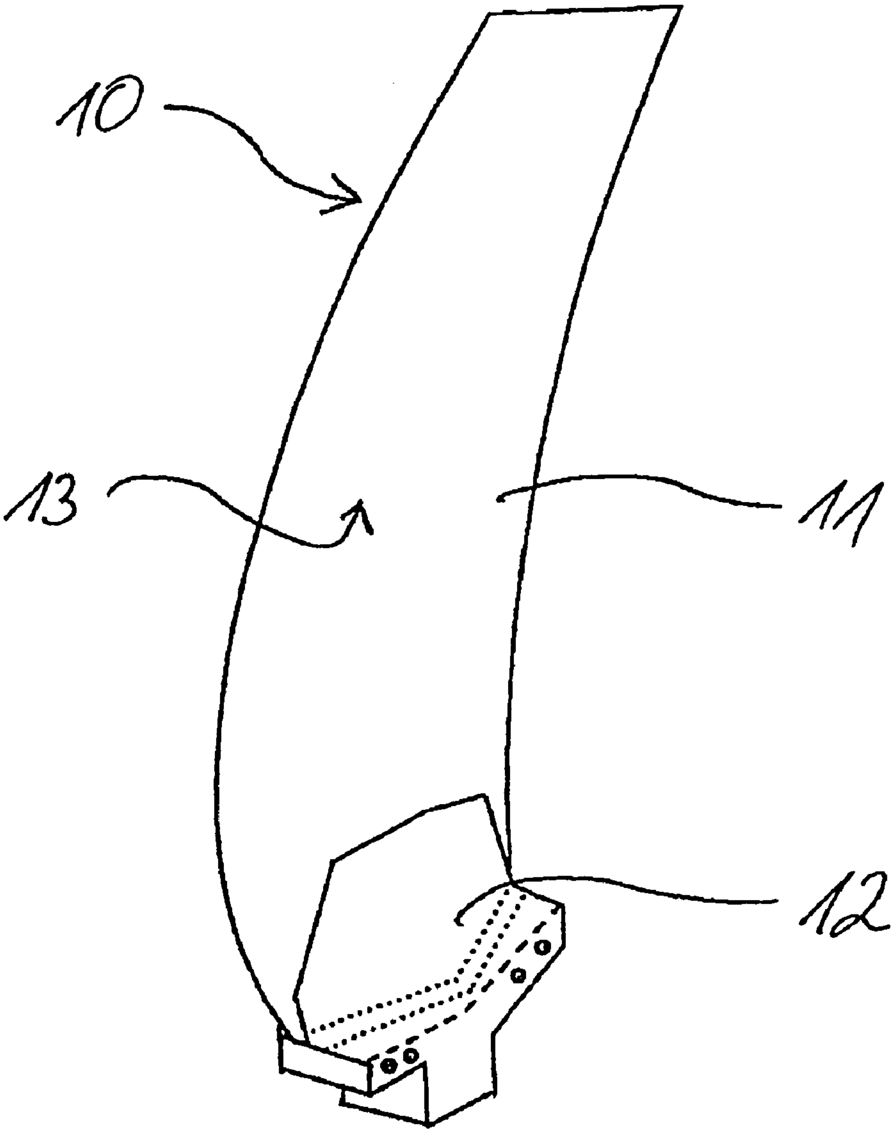
FIG. 1 is a highly schematic diagram of a blade of a gas turbine having an inventive wear-resistant coating.
Figure 2:
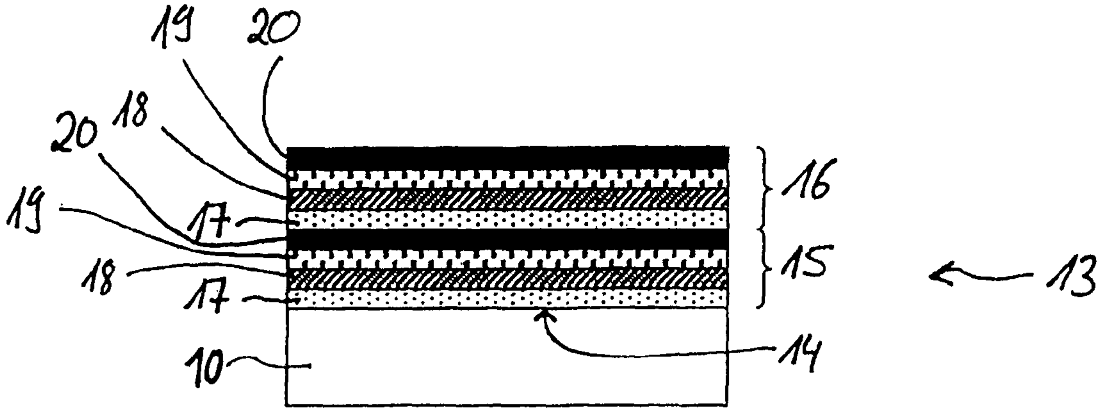
FIG. 2 is a highly schematic cross section through an inventive wear-resistant coating according to a first exemplary embodiment of the invention.
Figure 3:
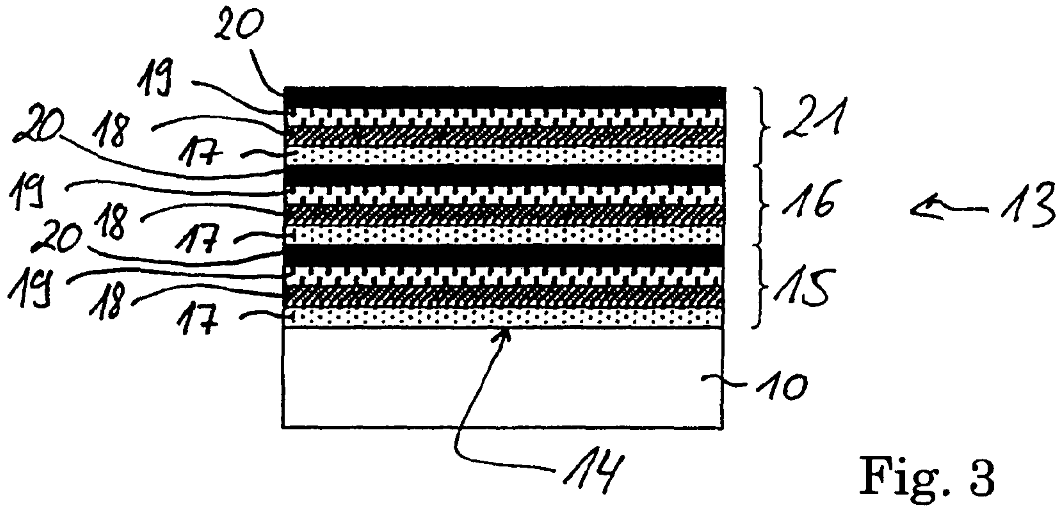
FIG. 3 is a highly schematic cross section through an inventive wear-resistant coating according to a second exemplary embodiment of the invention.
Figure 4:
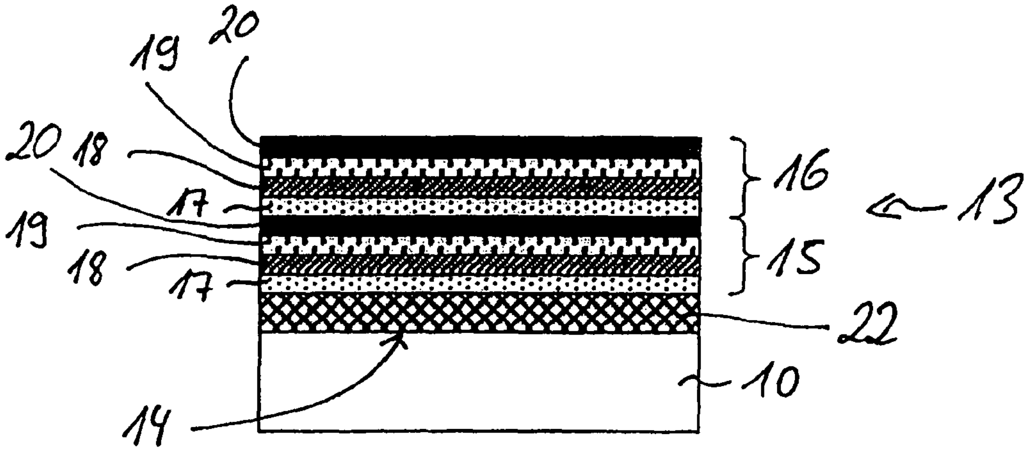
FIG. 4 is a highly schematic cross section through an inventive wear-resistant coating according to a third exemplary embodiment of the invention.

The present invention is explained in greater detail below with reference to FIGS. 1 through 4. FIG. 1 shows a blade of a gas turbine in a perspective view having an inventive wear-resistant coating. FIGS. 2 through 4 show schematic cross sections through the blade, each having different inventive wear-resistant coatings.

FIG. 1 shows a blade 10 of a gas turbine with a blade pan 11 and a blade foot 12. In the exemplary embodiment in FIG. 1, the entire blade 10, namely a surface thereof to be protected, is coated with a wear-resistant coating 13. Although the complete blade 10 is coated with the wear-resistant coating in the exemplary embodiment shown here, it is also possible for the blade 10 to have the wear-resistant coating 13 in only some sections, i.e., only in the area of the blade pan 11 or in parts thereof or in the area of the blade foot 12. Other gas turbine components such as the housing or the integrally bladed rotors such as blisks (bladed disks) or blings (bladed rings) may also be coated with the wear-resistant coating 13.

In FIG. 2 the component to be coated is labeled with reference numeral 10. The inventive wear-resistant coating 13 is applied to a surface 14 of the component 10 to be coated. In the exemplary embodiment in FIG. 2, the wear-resistant coating 13 consists of two multilayer systems 15 and 16 applied repeatedly to the surface 14. Each of the two multilayer systems 15 and 16 consists of four different layers, a first layer 17 of each multilayer system 15 and 16 facing the surface 14 to be coated being formed from a metallic material adapted to the composition of the component 10 to be coated. A second layer 18 of each multilayer system 15 and 16 applied to the first layer 17 is made of a metal alloy material adapted to the composition of the component 10 that is to be coated. A third layer 19 of each multilayer system 15 and 16 applied to the second layer 18 is made of a gradated metal-ceramic material, and a fourth layer 20 of each multilayer system 15 and 16 applied to the third layer 19 is made of a ceramic material. The gradated metal-ceramic material within the layer 19 forms a transition between the second layer 18 and the fourth layer 20, namely from the metal alloy of the second layer 18 to the ceramic material of the fourth layer 20.

In the exemplary embodiment of FIG. 3, another multilayer system 21 is applied to the multilayer system 15 and 16 described above, this additional multilayer system corresponding to the multilayer systems 15 and 16 with regard to the design of the individual layers 17 through 20. It is also possible to provide 4, 5 or a greater number of such multilayer systems 15, 16 and/or 21 repeatedly one above the other to form an inventive wear-resistant coating 13. The multilayer systems may also be formed, i.e., assembled from more than four layers.

In the exemplary embodiment in FIG. 4, an adhesive layer 22 is applied between the surface 14 of the component 10 to be coated and the first multilayer system 15 adjacent to the surface 14. The adhesive layer 22 permits better contact between the inventive wear-resistant coating 13 and the component 10 that is to be coated.

The concrete design of the individual layers 17 through 20 of the multilayer systems 15, 16 and 21 is adapted to the material composition of the component 10 that is to be coated. A few examples are provided below.

In the case of a component 10 that is to be coated and is made of a nickel-based material or a cobalt-based material or an iron-based material, the first layer 17 is preferably designed as a nickel layer (Ni layer). Then a second layer 18 made of a nickel-chromium material (NiCr layer) is applied to such a Ni layer 17. Then, as the third layer 19, a gradated metal-ceramic layer is applied to the second layer 18 of nickel-chromium material, whereby the metal-ceramic layer is preferably made of a $CrN_{1-x}$ material ($CrN_{1-x}$ layer). The fourth layer 20 is formed by a ceramic material, namely chromium nitride (CrN layer).

According to another example, the component 10 to be coated is made of a titanium-based material. With such a component 10 that is to be coated and is made of a titanium-based material, the first layer 17 is preferably made of titanium, palladium or platinum. Then a second layer 18 formed by a TiCrAl material or a CuAlCr material is applied to such a first layer 17. This is then followed by a third layer 19 which is a gradation layer formed either from a $CrAlN_{1-x}$ material or a $TiAlN_{1-x}$ material. In the case when the gradation layer 19 is formed by a $CrAlN_{1-x}$ material, the fourth layer 20 is a CrAlN layer as a ceramic layer. In the case when the gradation layer 19 is formed by a $TiAlN_{1-x}$ material, the fourth layer 20 is preferably made of titanium aluminum nitride (TiAlN). Instead of the titanium aluminum nitride material, in this case, however, a TiAlSiN material or an AlTiN material or a TiN/AlN material may be used as the ceramic material for the fourth layer 20.

The inventive wear-resistant coating 13 is applied to the component 10 that is to be coated in the sense of the present invention by means of a PVD coating process. The layer thickness of a multilayer system of the inventive wear-resistant coating preferably amounts to less than 15 μm.

The inventive wear-resistant coating is preferably used for complex three-dimensional components exposed to high fluidic loads such as housing elements, guide vane segments, rotor blade segments, integrally bladed rotors or individual blades for aircraft engines. The entire component or just an area of same may be coated with the wear-resistant coating according to this invention.

The invention claimed is:

1. A wear-resistant coating, in particular an erosion-resistant coating applied to a surface of a component that is exposed to fluid loads, in particular a gas turbine component whose surface is to be protected, wherein the wear-resistant coating is made of one or more multilayer systems applied repeatedly to the surface to be coated, wherein each of the multilayer systems has at least four different layers, wherein a first layer facing the surface that is to be coated of each multilayer system is made of a metallic material adapted to a composition of the component surface that is to be coated, wherein a second layer applied to the first layer of each multilayer system is made of a metal alloy material that is adapted to the composition of the component surface to be coated, wherein a third layer applied to the second layer of each multilayer system is made of a gradated metal-ceramic material and a fourth layer applied to the third layer of each multilayer system is made of a nanostructured ceramic material.

2. The wear-resistant coating according to claim 1, wherein each of the multilayer systems applied repeatedly has a same layer structure.

3. The wear-resistant coating according to claim 1, wherein the component is made of a nickel-based material or a cobalt-based material or an iron-based material and wherein the first layer of each multilayer system is made of a nickel material or a cobalt material.

4. The wear-resistant coating according to claim 1, wherein the component is made of a nickel-based material or cobalt-based material or iron-based material and wherein the second layer of each multilayer system is made of a nickel alloy material, preferably an NiCr material or a cobalt alloy material or an iron alloy material.

5. The wear-resistant coating according to claim 1, wherein the component is made of a nickel-based material or a cobalt-based material or an iron-based material and wherein the fourth layer of each multilayer system is made of a CrN material and is nanostructured.

6. The wear-resistant coating according to claim 1, wherein the component is made of a titanium-based material and wherein the first layer of each multilayer system is formed from a titanium material or a platinum material or a palladium material.

7. The wear-resistant coating according to claim 6, wherein the second layer of each multilayer system is formed from a titanium alloy material or an aluminum alloy material, preferably a TiCrAl material or a CuAlCr material.

8. The wear-resistant coating according to claim 6, wherein the fourth layer of each multilayer system is made of a CrAlN material or a TiAlN material or a TiAlSiN material or a TiN/AlN material and is nanostructured.

9. The wear-resistant coating according to claim 1, wherein a total layer thickness of the layers of each multilayer system is less than 15 μm.

10. The wear-resistant coating according to claim 1, wherein several multilayer systems are applied repeatedly to the surface of the component, and wherein an adhesive layer is applied between the surface of the component and a first multilayer system adjacent to the surface.

11. A component, in particular a gas turbine component, having a wear-resistant coating, especially an erosion-resistant coating which is applied to a surface of the component that is exposed to fluidic loads and is to be protected, the wear-resistant coating being made of one or more multilayer systems applied repeatedly to the surface, wherein each of the multilayer systems has at least four different layers; wherein a first layer facing the surface in each multilayer system consists of a metallic material adapted to a composition of the component surface; wherein a second layer of each multilayer system applied to the first layer consists of a metal alloy material adapted to the composition of the component surface; wherein a third layer applied to the second layer of each multilayer system is made of a gradated metal-ceramic material; and wherein a fourth layer applied to the third layer of each multilayer system consists of a nanostructured ceramic material.

12. The component according to claim 11, wherein the component is a housing or a guide vane or a rotor blade or a guide vane segment or a rotor blade segment or an integrally bladed rotor of a gas turbine, in particular of an aircraft engine.

13. A wear-resistant coating for a surface of a component that is exposed to fluid loads, comprising:

a first layer made of a metallic material adapted to a composition of the component surface to be coated;

a second layer applied to the first layer made of a metal alloy material that is adapted to the composition of the component surface;

a third layer applied to the second layer made of a gradated metal-ceramic material; and a fourth layer applied to the third layer made of a nanostructured ceramic material.

14. A component that is exposed to fluid loads, comprising:

a wear-resistant coating applied to a surface of the component, wherein the coating includes:

a first layer made of a metallic material adapted to a composition of the surface of the component;

a second layer applied to the first layer made of a metal alloy material that is adapted to the composition of the surface of the component;

a third layer applied to the second layer made of a gradated metal-ceramic material; and a fourth layer applied to the third layer made of a nanostructured ceramic material.

15. A method of forming a wear-resistant coating for a surface of a component that is exposed to fluid loads, comprising the steps of:

forming a first layer made of a metallic material adapted to a composition of the component surface to be coated;

applying a second layer to the first layer made of a metal alloy material that is adapted to the composition of the component surface;

applying a third layer to the second layer made of a gradated metal-ceramic material; and applying a fourth layer to the third layer made of a nanostructured ceramic material.

16. A method of protecting a surface of a component that is exposed to fluid loads, comprising the steps of:

applying a first layer made of a metallic material adapted to a composition of the surface of the component to the surface of the component;

applying a second layer to the first layer made of a metal alloy material that is adapted to the composition of the surface of the component;

applying a third layer to the second layer made of a gradated metal-ceramic material; and applying a fourth layer to the third layer made of a nanostructured ceramic material.

* * * * *